(12) United States Patent
Mansfield (10) Patent No.: US 9,002,531 B2
(45) Date of Patent: Apr. 7, 2015

(54) SYSTEM AND METHOD FOR PREDICTIVE PEAK LOAD MANAGEMENT VIA INTEGRATED LOAD MANAGEMENT

(71) Applicant: Carl Mansfield, Camas, WA (US)

(72) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/631,390

(22) Filed: Sep. 28, 2012

(65) Prior Publication Data

US 2014/0094979 A1    Apr. 3, 2014

(51) Int. Cl.
*H02J 3/14* (2006.01)
*H02J 3/00* (2006.01)

(52) U.S. Cl.
CPC ............. *H02J 3/14* (2013.01); *H02J 2003/003* (2013.01)

(58) Field of Classification Search
USPC ........................................................ 700/291
See application file for complete search history.

(56) References Cited

U.S. PATENT DOCUMENTS

| | | | | |
|---|---|---|---|---|
| 4,023,043 | A * | 5/1977 | Stevenson | 307/38 |
| 6,624,532 | B1 | 9/2003 | Davidow et al. | |
| 6,889,122 | B2 * | 5/2005 | Perez | 700/295 |
| 7,373,222 | B1 * | 5/2008 | Wright et al. | 700/295 |
| 7,715,951 | B2 | 5/2010 | Forbes, Jr. et al. | |
| 8,010,812 | B2 | 8/2011 | Forbes, Jr. et al. | |
| 8,019,697 | B2 | 9/2011 | Ozog | |
| 8,032,233 | B2 | 10/2011 | Forbes, Jr. et al. | |
| 2004/0076860 | A1 * | 4/2004 | Aso | 429/23 |
| 2004/0260489 | A1 * | 12/2004 | Mansingh et al. | 702/60 |
| 2005/0107892 | A1 * | 5/2005 | Matsui et al. | 700/28 |
| 2006/0276938 | A1 * | 12/2006 | Miller | 700/295 |
| 2008/0040295 | A1 * | 2/2008 | Kaplan et al. | 705/412 |
| 2008/0046387 | A1 * | 2/2008 | Gopal et al. | 705/412 |
| 2008/0058998 | A1 * | 3/2008 | Breit | 700/295 |
| 2009/0292402 | A1 * | 11/2009 | Cruickshank, III | 700/287 |
| 2009/0296342 | A1 * | 12/2009 | Matteson et al. | 361/679.46 |
| 2009/0302681 | A1 * | 12/2009 | Yamada et al. | 307/46 |
| 2009/0326729 | A1 * | 12/2009 | Hakim et al. | 700/295 |
| 2010/0023176 | A1 * | 1/2010 | Imagawa et al. | 700/295 |
| 2010/0094476 | A1 * | 4/2010 | Hamilton et al. | 700/295 |
| 2010/0286937 | A1 * | 11/2010 | Hedley et al. | 702/60 |

(Continued)

OTHER PUBLICATIONS

Shao, Vic "Commercial Buildings and Utilities—More in Common Than One Would Think" Environmental Leader News Environmentalleader.com Aug. 2, 2012.*

(Continued)

*Primary Examiner* — Ryan Jarrett
(74) *Attorney, Agent, or Firm* — Brooks Acordia IP Law, PC; Pejman Yedidsion; David Ripma (57) ABSTRACT

Devices, methods, and systems for predictive peak load management via integrated load management comprising the steps of: determining a target peak load based on a capacity of an energy storage device and a value of a load management capacity of a set of one or more manageable load assets, determining for each period of a defined time period, an expected peak load based on the determined target peak load, engaging the energy storage device, wherein the energy storage device is engaged based on an energy supply level of the energy storage device and the expected peak load, and performing load management on the set of one or more manageable load assets based on the engaged energy storage device and the determined target peak load.

20 Claims, 11 Drawing Sheets

(56) References Cited

U.S. PATENT DOCUMENTS

| | | | |
|---|---|---|---|
| 2010/0292856 A1* | 11/2010 | Fujita | 700/291 |
| 2011/0172837 A1* | 7/2011 | Forbes, Jr. | 700/291 |
| 2011/0202910 A1 | 8/2011 | Venkatakrishnan et al. | |
| 2011/0231028 A1 | 9/2011 | Ozog | |
| 2011/0257803 A1* | 10/2011 | Yamamoto et al. | 700/291 |
| 2012/0032814 A1* | 2/2012 | Radovilsky et al. | 340/657 |
| 2012/0179301 A1* | 7/2012 | Aivaliotis et al. | 700/286 |
| 2012/0229081 A1* | 9/2012 | Kiuchi et al. | 320/107 |
| 2012/0245751 A1* | 9/2012 | Gow et al. | 700/291 |
| 2012/0296480 A1* | 11/2012 | Raman et al. | 700/277 |
| 2013/0018821 A1* | 1/2013 | Shao | 705/412 |
| 2013/0030590 A1* | 1/2013 | Prosser | 700/295 |
| 2013/0134962 A1* | 5/2013 | Kamel et al. | 324/103 R |
| 2013/0190939 A1* | 7/2013 | Lenox | 700/291 |
| 2013/0221929 A1* | 8/2013 | Prosser | 320/135 |
| 2013/0261823 A1* | 10/2013 | Krok et al. | 700/291 |
| 2013/0285446 A1* | 10/2013 | Chow et al. | 307/18 |
| 2014/0067140 A1* | 3/2014 | Gow | 700/291 |

OTHER PUBLICATIONS

Green Charge Networks "Power Efficiency Case Study Intelligent Energy Storage System 7 eleven Case Study" Greenchargenet.com Sep. 2013.*

* cited by examiner

SYSTEM AND METHOD FOR PREDICTIVE PEAK LOAD MANAGEMENT VIA INTEGRATED LOAD MANAGEMENT

BACKGROUND

Electricity suppliers may charge a fee to their customers both for energy consumption, measured in kilowatt-hour (kWh), and for their peak demand, or maximum power rating, measured in kilowatt (kW), that may be assessed during a particular billing period. By and large, peak demand may be assessed and billed monthly, that is, a charge may be assessed based on the maximum demand by the customer for that particular month. Alternative billing schemes, for example, annual peak demand, may also be used in determining these assessments.

SUMMARY

Embodiments include methods, systems, and devices where, for example a peak load management system embodiment may include: a battery system configured to store energy and discharge stored energy when actual load exceeds a target peak load; one or more managed loads configured to allow reduced energy consumption when needed to meet a target peak load; and a peak load management processor operatively coupled with the battery system and managed loads and configured to: continually measure actual load, determine predicted load data based at least in part on past actual load; determine if operation of battery system alone can allow target peak to be achieved; reduce energy consumption of managed loads only if battery system alone is not capable of maintaining target peak load; and discharge energy from battery system to maintain target peak load.

The peak load management system embodiment may further be configured to: calculate a target peak load based at least in part on: past actual load; energy storage and power capability of battery system; and estimated reduced energy consumption achievable by dispatching managed loads. Optionally the battery system may be engaged if the energy supply level of the battery system is greater than zero. In another embodiment, the battery system may be engaged if the actual load is greater than the target peak load. Additionally, the load reduction may be invoked if the energy supply level of the energy storage device is predicted to reach zero while attempting to meet target peak where the degree of load reduction invoked may be determined from a predicted peak load, based at least in part on past actual load and where the energy consumption may be reduced if the actual load is greater than the target peak load. Additionally, the system may periodically predict if the battery system can achieve target peak load at currently dispatched levels of load management, and additional load management resources may be dispatched as needed based on this prediction. The system embodiment may also have the target peak load further based on a peak demand energy usage of a real property. The system may also comprise electricity load. Additionally, they system may periodically predict if battery system can achieve target peak load at currently dispatched levels of load management, and additional load management resources may be dispatched as needed based on this prediction. The system embodiment may also have the target peak load further based on a peak demand energy usage of a real property. The system may also comprise electricity load.

Embodiments include methods, systems, and devices where, for example a method embodiment may include the steps of: determining a predicted load data based at least in part on measured actual load and past actual load; reducing energy consumption by one or more managed loads when needed to meet a target peak load; determining, by a peak load management processor operatively coupled with a battery system and the one or more managed loads, if operation of the battery system alone can allow target peak to be achieved; reducing energy consumption of the one or more managed loads if the battery system alone is not capable of maintaining target peak load; and discharging energy from the battery system to maintain target peak load; wherein the battery system is configured to store energy and discharge stored energy when actual load exceeds a target peak load. Optionally, the battery system may be engaged if the energy supply level of the battery system is greater than zero. Alternatively, the battery system may be engaged if the energy usage is greater than the target peak load.

The method embodiments may also comprise a scenario where the load reduction may be invoked if the energy supply level of the battery system is predicted to reach zero while attempting to meet target peak. Additionally, the degree of load reduction invoked may be determined from a predicted peak load, based at least in part on past actual load and the load reduction may be invoked if the energy usage is greater than the target peak load. Embodiments may also apply where it is periodically predicted if the battery system can achieve target peak load at currently dispatched levels of load management, and additional load management resources are dispatched as needed based on this prediction. Optionally, the target peak load is further based on a peak demand energy usage of a real property.

In some embodiments the method may further include the step of: calculating a target peak load based at least in part on: past actual load; energy storage and power capability of the battery system; and estimated reduced energy consumption achievable by dispatching managed loads. Optionally, the load may comprise electricity load.

BRIEF DESCRIPTION OF THE DRAWINGS

Embodiments are illustrated by way of example and not limitation in the figures of the accompanying drawings, and in which.

DETAILED DESCRIPTION

An energy management system may comprise an energy monitoring and control system where the monitoring system monitors energy generating devices and energy consuming devices in the system and said control system effects changes in the operation of certain energy generating and energy consuming devices in the system to realize load management. Additionally, the energy monitoring system may check for the capacity and output of the energy generating devices along with the consumption of energy by the energy consuming devices. In one embodiment, the energy management system may calculate the net total energy usage of the system as the sum of energy consumed by all energy consuming devices in the system, minus the energy produced by all energy generating devices in the system. In one embodiment, this net total energy usage reflects the energy that must be supplied to the system by outside sources, such as the electricity grid. Some examples of energy consuming devices may include: appliances installed on the property, such as: a water heater; an air conditioning unit; lighting systems; elevators; pool pumps; a food refrigeration system; a multi-function peripheral (MFP) device; and a television set. Some examples of energy generating devices may include: a solar generation installation; and diesel generators. The energy management system may also comprise one or more energy storage devices where the energy storage device may act as either an energy generating device or energy consuming device. One exemplary embodiment of the energy storage device may be a battery storage system.

In one embodiment, net total energy usage of the system during the electricity billing period may be minimized to reduce peak demand charges assessed by the electricity service provider, and thereby reduce energy costs. Energy storage systems, e.g., battery system, in some cases coupled with solar generation systems, may reduce the peak demand. In the embodiment where an energy storage system, e.g., battery system, is used, the peak demand may be reduced by discharging the battery system during periods where the net energy usage of the system is at its highest. In some embodiments, the energy management system may actively control the discharge behavior of the battery system in order to realize a particular peak reduction strategy.

In some embodiments, the ability of a battery system to reduce demand may be dependent on the capacity of the battery (kWh), maximum power rating (kW), and the time dependent size and shape of the electric demand curve of the loads of the system. In an exemplary embodiment, the energy consumption of a system may have a regular, periodic daily shape of demand curve, where a usage peak load of each day may be in the afternoon or early evening. The exact magnitude of demand and precise shape of the curve, e.g., width of peaks, rate of change of power with time, may vary on a day to day basis. In some embodiments, this may depend on conditions such as: temperature or weather, which may dictate the requirements for energy consuming devices, for example, heating, ventilation, and air conditioning (HVAC) system and lighting system operation; occupant behavior, which may dictate which energy consuming devices are utilized; and day of the week, which may dictate usage characteristics of the property itself.

In one embodiment, the peak load management system comprises an energy storage system coupled with a load management system. The load management system may comprise one or more energy consuming devices at the site which may be controlled by the peak load management system to reduce their energy consumption, as needed, to realize a particular peak load management strategy. Examples of such managed energy consuming devices include: networked thermostats, networked load switches and networked lighting controls. In one embodiment, reducing the energy consumption of managed devices will result in an impact to the comfort or operations of the facility. That is, reducing energy consumption of HVAC systems, may for example result in higher temperatures at the property, potentially, reducing occupant comfort. Accordingly, it may be undesirable to regularly use such load management capability.

In an exemplary embodiment, by leveraging the load management with the battery system according to a particular strategy, more aggressive peak load and demand charge management may be accomplished while minimizing the usage of load management and effectively improving the overall battery system utilization.

Figure 1:
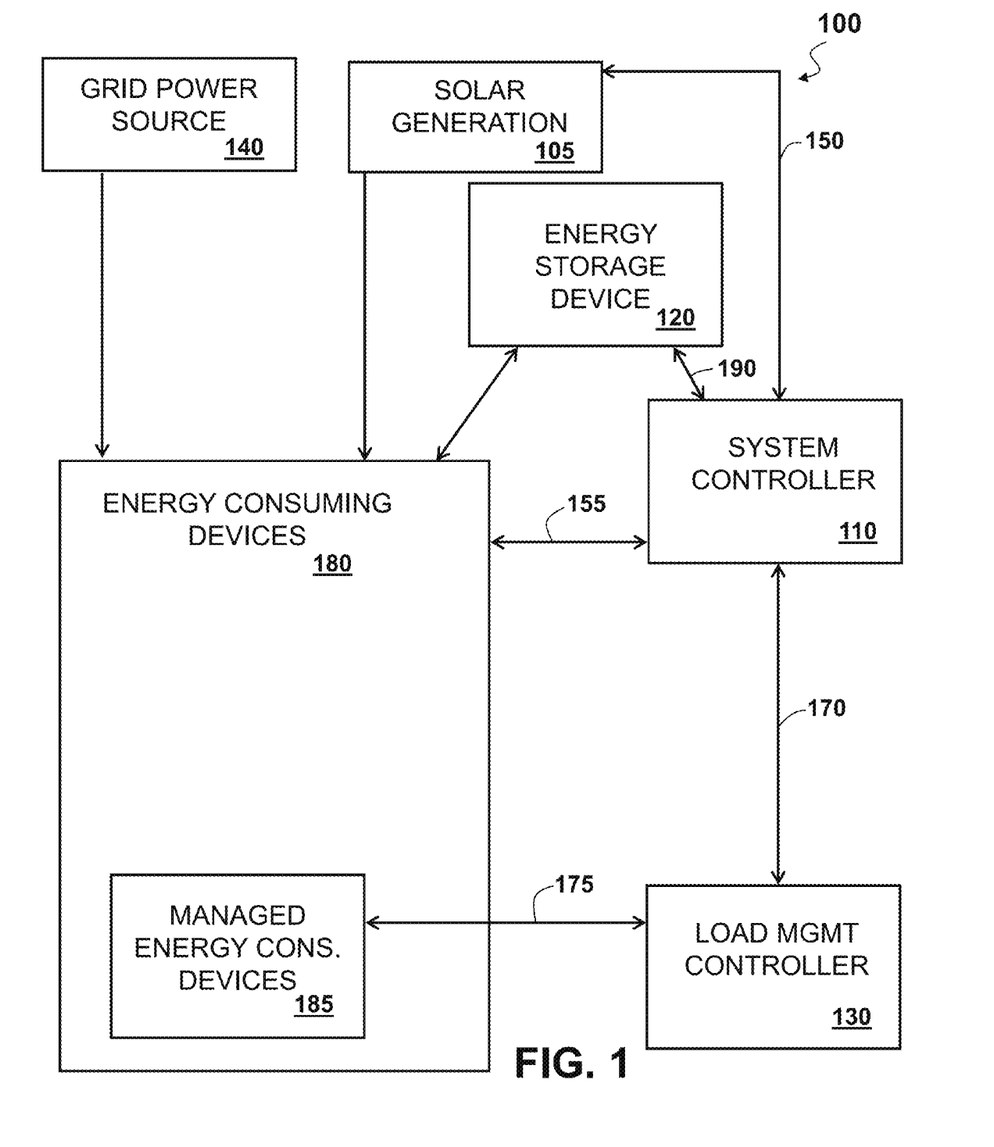
FIG. 1 is a functional block diagram of an exemplary energy management system embodiment.

FIG. 1 is a functional block diagram of an exemplary energy management system 100 embodiment where the energy management system 100 comprises a system controller 110 to: monitor energy usage of local energy consuming devices 180 using communications interface 155, monitor generation of a local power source, e.g., an on-site solar electric generation system 105 using communications interface 150, monitor and control a local energy storage device 120 using communications interface 190, and command a load management controller 130 to implement load management using communications interface 170. The load management controller 130 communicates with managed energy consuming devices 185 using communications interface 175 to implement load management as directed by system controller 110. The energy management system 100 also comprises a grid power source 140 to supply additional power to energy consuming devices 180 beyond that supplied by the local solar electric generation 105 and the energy storage device 120.

The system controller 110 is configured to monitor local power generation level of the local power source 105, local power generation or consumption of local energy storage device 120, and the power consumption levels of the local devices 180. Based on the generation and consumption levels, the system controller 110 may:

command energy storage device 120 to adjust its power input or output level using communications interface 190; and/or command load management controller 130 using communications interface 170 to implement load control of managed energy consuming devices 185;

the control may be implemented according to a particular strategy in order to maintain the net supply from grid power source 140 to energy consuming devices 180 at or below a target peak load.

In one embodiment, peak load across multiple day assessment periods, e.g., a billing month, may be managed, by: (i) predicting the worst case day expected for each month based at least in part on prior load data; (ii) assessing the peak load achieved after effective use of battery resources on that predicted worst day; and (iii) operating the battery storage system every day of the billing period only as needed to meet the expected peak load of that worst case day. This cycle efficient predictive system may result in the battery system remaining idle over a period of time, as the battery may only be engaged when needed to achieve a reduction in the monthly electricity usage of the system.

In one embodiment, load management may be used in conjunction with a cycle efficient predictive battery storage system, where the controller may engage load management to reduce the peak energy usage. Load management may be defined as the operation of system embodiments, at the customer site, that may result in managed energy consuming devices 185 by altering their state of operation to reduce the energy consuming devices' 185 electricity consumption. In one exemplary embodiment, the target devices may be operated in this adapted state over a defined period of time as determined by the system controller in order to reduce the effective energy use of the site. In this embodiment the system controller 110 will cause the managed energy consuming devices 185 to operate only on days with a sufficiently large anticipated and predicted peak load such that, by engaging the managed energy devices, the resulting load is reduced sufficiently to allow the battery system to be operated in a manner to achieve the target peak load where it would not have been able to do so without such load management.

Reducing operation of such systems may impact "quality" of operation of the customer site, and may not be desirable. In this embodiment, the battery storage and load management may be leveraged so as to together reduce the usage of load management while maintaining an aggressive target peak load. Accordingly, if the worst day usage is predicted along with battery system utilization and load management, the overall battery system operation may improve and the peak load reduction performance may increase.

In one embodiment, the energy management system may be used at a property comprising on-site loads and energy storage systems, where a portion of the on-site loads may be managed by the system. This management of loads may mean that the energy management system is capable of causing the loads to reduce their operation in order to reduce electricity demand. In some embodiments, it may be undesirable to reduce the operation of managed loads as this may reduce the operational quality of systems at the property, for example, reducing the HVAC load, at the cost of potentially uncomfortable temperatures. In addition to storage and loads, some of which are manageable, the site may include renewable generation of energy, for example, a solar PV system, which may have impact on the load shape at the property and may also have its output predicted by the energy management system. Accordingly, control of the storage device and use of load management on energy consuming assets and or devices may be utilized in order to achieve improved peak load reduction at the property, while maximizing the effective use of the storage asset and minimizing the usage of load reduction to maintain effective operation of systems at the property.

Figure 2:
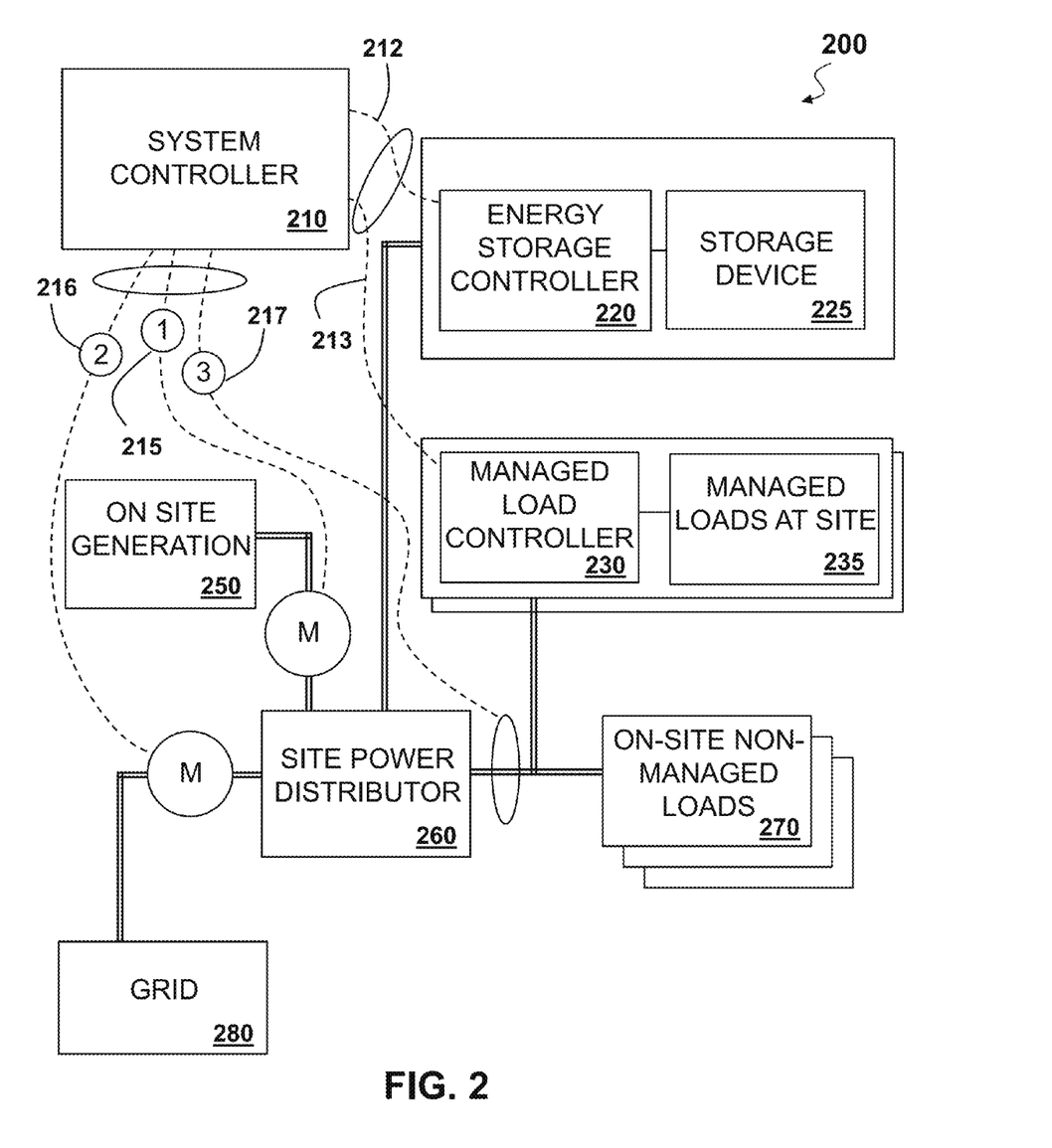
FIG. 2 is a functional block diagram of an exemplary system controller, energy storage controller, and managed load controller.

FIG. 2 depicts in a functional block diagram, the system controller 210 communicating with, via control connections 212, 213, and sending control signals to, an energy storage controller 220 and a managed load controller 230. The system controller 210 may use the control connections 212, 213 to control the rate of storage charge and or engage the storage device 225 to discharge the storage device and in some embodiments, to initiate any load control managed loads. The system controller 210 may calculate, based on the energy storage controller 220 providing information, how much energy the storage device 225 may provide and accordingly set a more aggressive target in conjunction with the load management and information received from the managed load controller 230. The system controller 210, via control connection 213, may communicate with the managed load controller 230 where the managed load controller 230 may operate the load management on the managed loads at the site. In one embodiment, the system controller 210 may also receive, via control connections 215, 216, 217, real-time metering data from at least one of: (1) a power flow connection between the on-site generator 250, e.g., photovoltaic (PV), and the site power distributor 260; (2) a power flow connection between the site power distributor 260 and the power grid 280; (3) a power flow connection between the site power distributor 260 and the loads, both managed loads 235 and non-managed loads 270, at the site; and (4) a power flow connection between any combination of the on-site generator 250, site power distributor 260, the energy storage device 225, the power grid 280, the managed loads 235, and/or the non-managed loads at the site 270. In one embodiment, the real-time metering data may result from the presence of an on-site generator meter, a utility billing meter, and or load energy usage sensor.

The embodiments of the system controller 210 may predict, for example, ahead of time, the worst case day of energy usage. Accordingly, the system controller 210 may leverage and use load management on the managed loads at the site 235 with the storage device 225 and achieve a more aggressive peak load. The system controller 210 may then target using up to, for example, 100%, of the storage device 225, i.e., the battery's full potential, before invoking, via the managed load controller 230, a load reduction scheme on the managed loads at the site 235. In one embodiment, the system controller 210 may function and predict in real-time so as to collect data and send control signals to achieve the aggressive peak load on each day of a billing period. Accordingly, the system controller 210 may determine, based on the billing period, an aggressive target, by first engaging and using the battery system and then invoking the load management scheme.

Figure 3A:
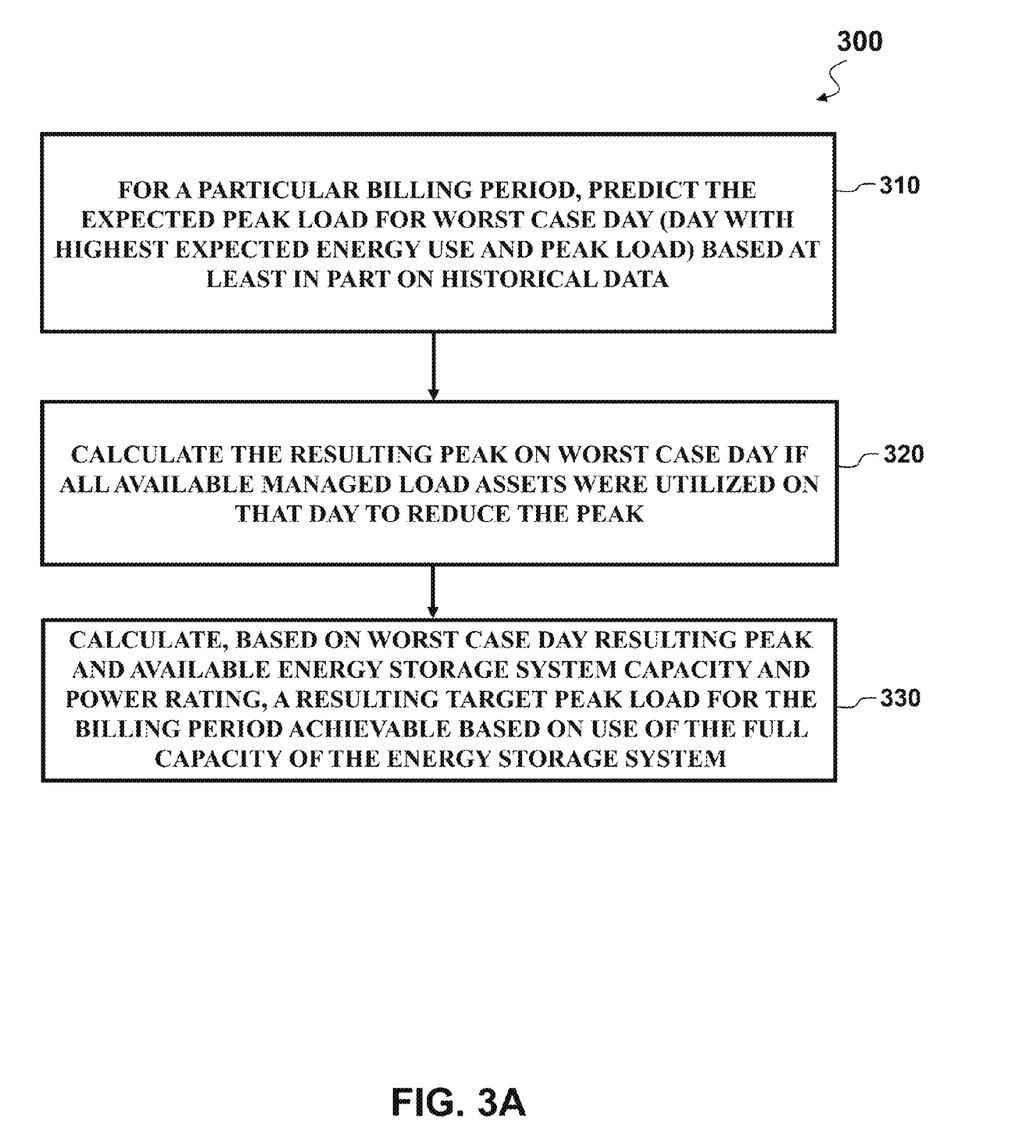
FIG. 3A is a flowchart depicting an exemplary process of the system controller.

FIG. 3A is an exemplary flowchart depicting an exemplary process of the system controller 300. In some embodiments, the system controller may be provided or be pre-loaded with a set of one or more energy load priorities and rules. Accordingly, the system may, for a particular billing period, predict the expected peak load for worst case day, i.e., day with highest expected energy use and peak load, based at least in part on historical data (step 310). The system is depicted in FIG. 3A as calculating the resulting peak on worst case day if all available managed load assets were utilized on that day to reduce the peak (step 320). The system is also depicted as calculating, based on worst case day resulting peak and available energy storage system capacity and power rating, a resulting target peak load for the billing period achievable based on use of the full capacity of the energy storage system, after use of available managed load assets (step 330). Accordingly, the system controller may perform the steps once per billing period to determine a target peak load. In this exemplary embodiment, for a billing period, e.g., one month, the system controller may predicted a peak load for a worst case day, then calculate the reduced load on that worst case day if all load management assets are dispatched to get a "resulting worst case day peak load" and then, based on that "resulting load" calculate a target peak load for the billing period. In this exemplary embodiment, the determined target peak load may remain in effect for the billing period.

Figure 3B:
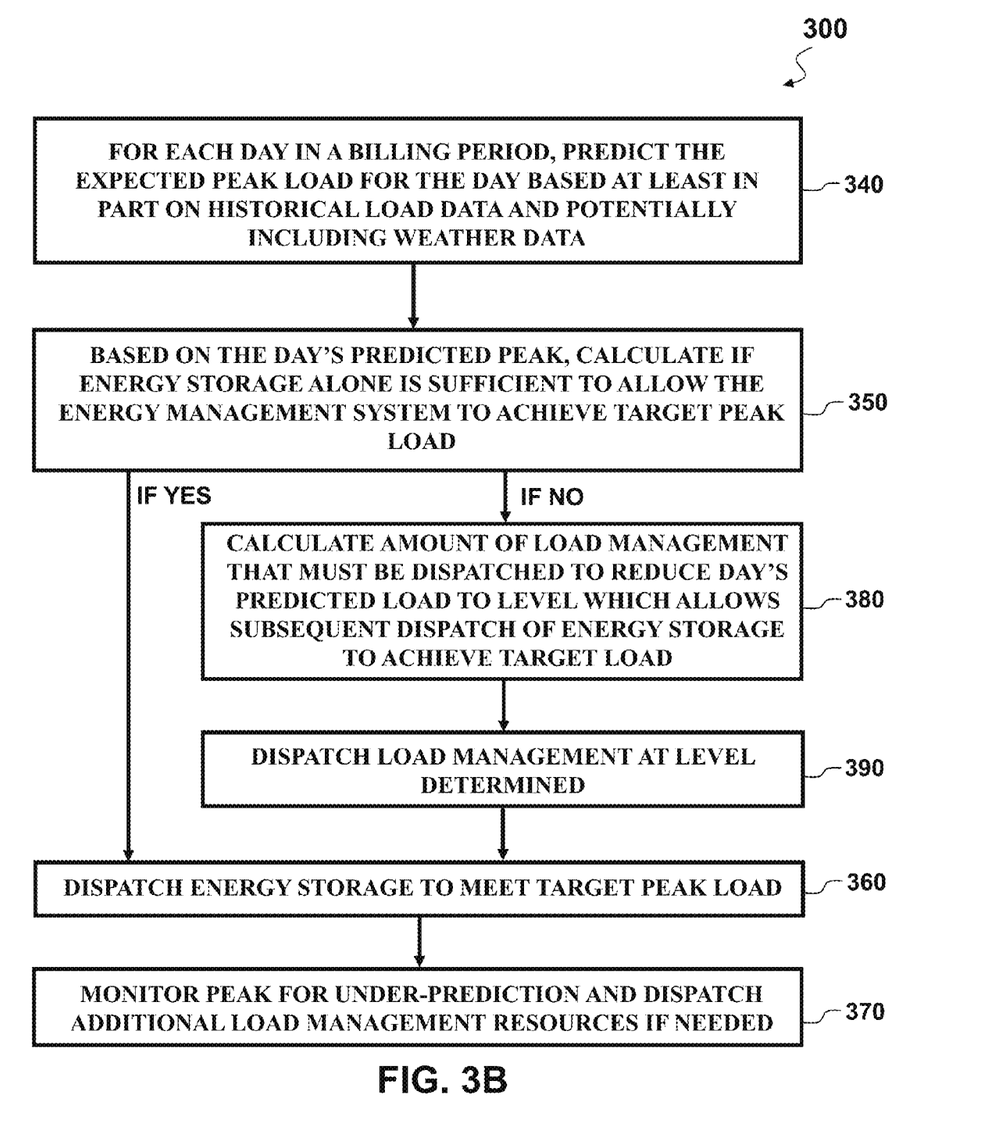
FIG. 3B is a flowchart depicting an exemplary process of the system controller.

FIG. 3B is another exemplary flowchart further depicting the exemplary process of the system controller 300 where the steps are performed once per day using the target peak load data. In this exemplary embodiment, for each day in the billing period, the system may further estimate the expected size of peak typically based on historical data and weather forecast, then calculate if energy storage is capable of pulling down the day's predicted peak to the target peak. If yes, target peak load may be maintained only by using the battery system. If no, calculate how much load management must be dispatched so that the day's predicted peak drops to a level that can be handled by the battery system. Accordingly, the system may, for each day in a billing period, predict the expected peak load for the day based at least in part on historical load data and potentially including weather data (step 340). The system is further depicted in FIG. 3B as calculating, based on the day's predicted peak, if energy storage alone is sufficient to allow the energy management system to achieve target peak load (step 350). If the energy storage alone is sufficient, the system may dispatch energy storage to meet target peak load (360). Subsequently, the system may monitor peak for under-prediction and dispatch additional load management resources if needed (step 370). If the energy storage alone is not sufficient, the system may calculate the amount of load management that must be dispatched to reduce the day's predicted load to levels which may allow subsequent dispatch of energy storage to achieve target peak load (step 380). The system is depicted as dispatching load management at levels determined in step 380 (step 390). Accordingly, the system controller may engage the load management and then dispatch battery to maintain peak at target peak. In some embodiments, because the day's predicted peak may be underestimated, the system may also need to monitor the peak as it is in process during the day and if the system calculates an underestimation was made, more load management must be engaged.

In one exemplary embodiment, an exemplary process of the energy management system may be carried out for predictive energy storage and load management, where the process may comprise the step of establishing a target peak load for a particular property during a billing period comprising a determined number of days. In some embodiments, the target peak load may be based on the following inputs: (a) predicted time varying demand, i.e., load shape, of the site, taking into account any on-site renewable generation, for the expected highest electricity demand day in the billing period; and (b) calculated achieved peak load reduction by utilizing the energy storage and load management assets on that worst case day. Optionally, the achievable load may then be used as the target peak load for the billing period. In some embodiments, once the target peak load for the billing period is established, the following steps may be carried out during operation of the system: (1) determine, via predicting, an expected peak load on each day; (2) engage the energy store, e.g., battery storage, where the available capacity is fully used in order to reduce the peak load from the predicted day's peak to the target peak, for example, cycle the battery storage in a manner where only the needed storage capacity is engaged; (3) if the target peak load may be achieved with the battery storage alone, no load management controls may be initiated; (4) if the battery system alone is unable to achieve the target peak load, load management, e.g., reduction of operation of certain manageable loads, may be invoked in addition to the battery storage use; and (5) use only the amount of load reduction necessary to achieve the target peak load for the billing period, for example, partial control of manageable loads may be used rather than the maximum available load management capacity.

Figure 4:
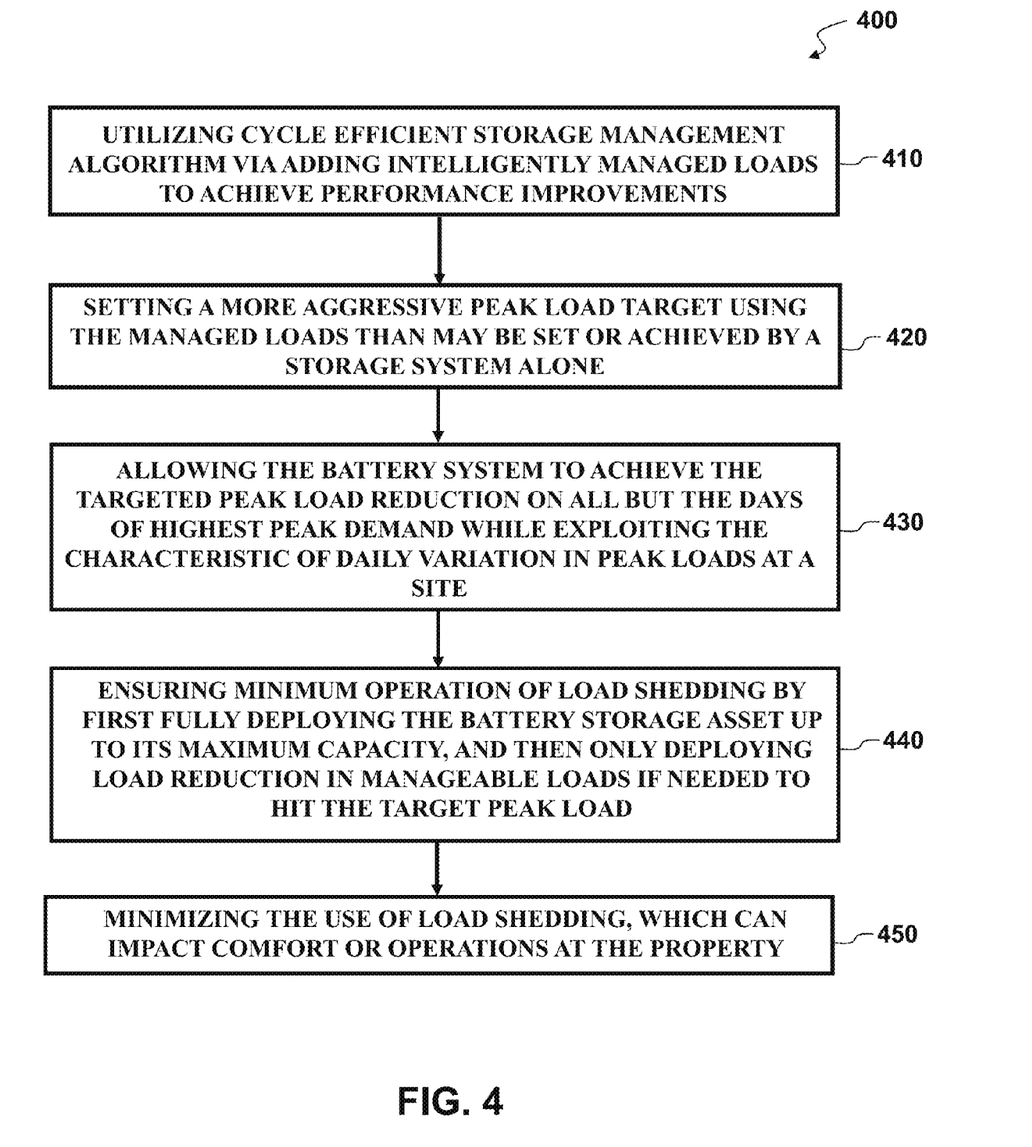
FIG. 4 is a flowchart depicting an exemplary process of the energy management system.

FIG. 4 is an exemplary flowchart depicting an exemplary process of the energy management system 400, comprising the steps of: utilizing cycle efficient storage management algorithm via adding intelligently managed loads to achieve performance improvements (step 410); setting a more aggressive peak load target using the managed loads than may be set or achieved by a storage system alone (step 420); allowing the battery system to achieve the targeted peak load reduction on all but the days of highest peak demand while exploiting the characteristic of daily variation in peak loads at a site (step 430); ensuring minimum operation of load shedding by first fully deploying the battery storage asset up to its maximum capacity, and then only deploying load reduction in manageable loads if needed to hit the target peak load (step 440); and minimizing the use of load shedding, which may impact comfort or operations at the property (step 450).

Figure 5A:
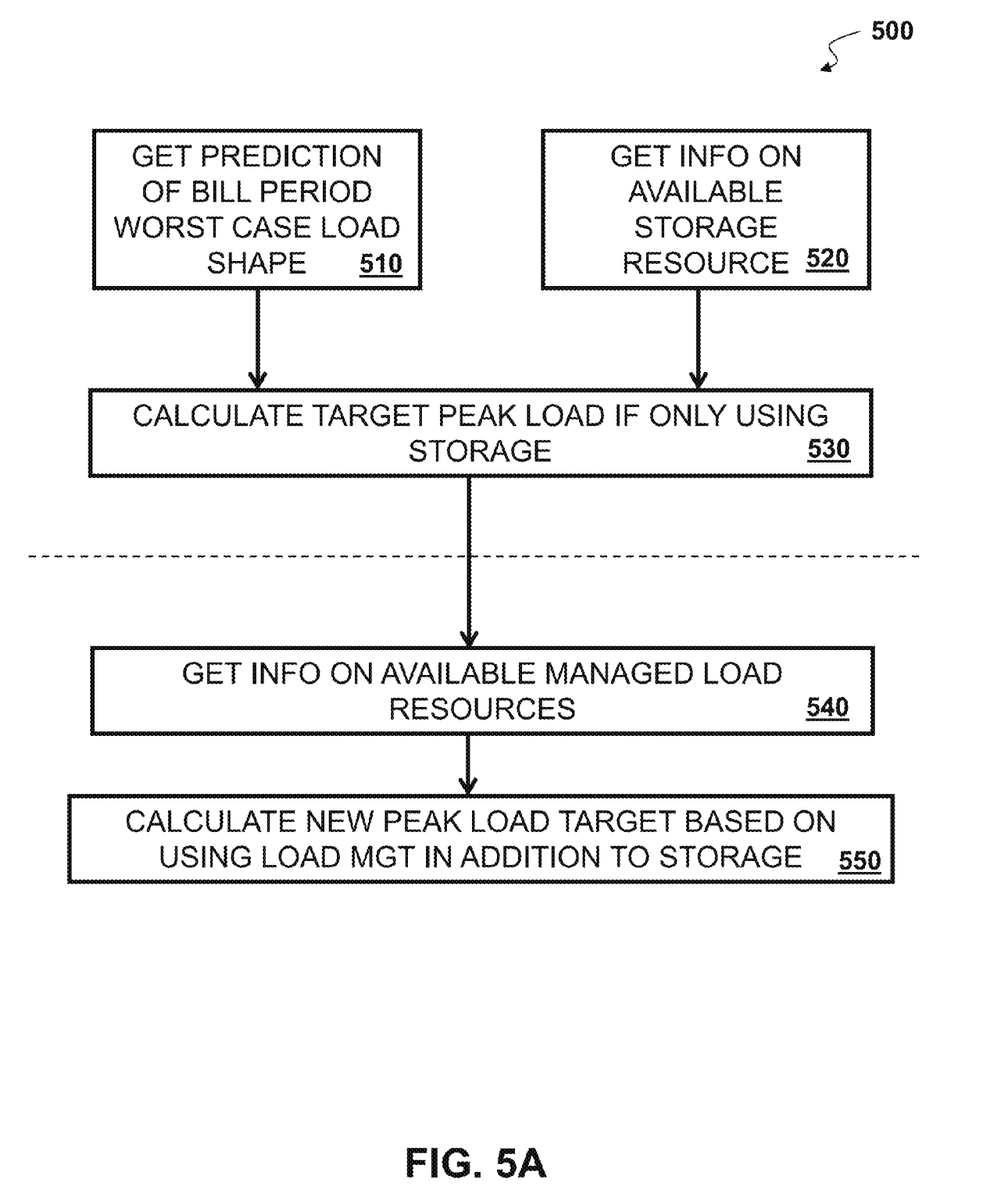
FIGS. 5A-5B depict an exemplary flowchart of an embodiment of the energy management system utilizing load management.

FIG. 5A is a flowchart depicting an exemplary process of the system controller 500 in calculating the billing periods target peak load. The system controller may be provided or be pre-loaded with a set of one or more energy load schemes. Accordingly, the system controller may get prediction of the billing period's worst case load shape (step 510) and additionally, get information on available storage resources (step 520) associated with the local devices of the system. The system controller is depicted in FIG. 5A as calculating (step 530) target peak load if it may only be using the battery storage system. The system controller is also depicted as getting (step 540) or estimating information on available managed load resources. Thereafter, the controller may calculate a new peak load target based on using load management in addition to the storage device (step 550).

Figure 5B:
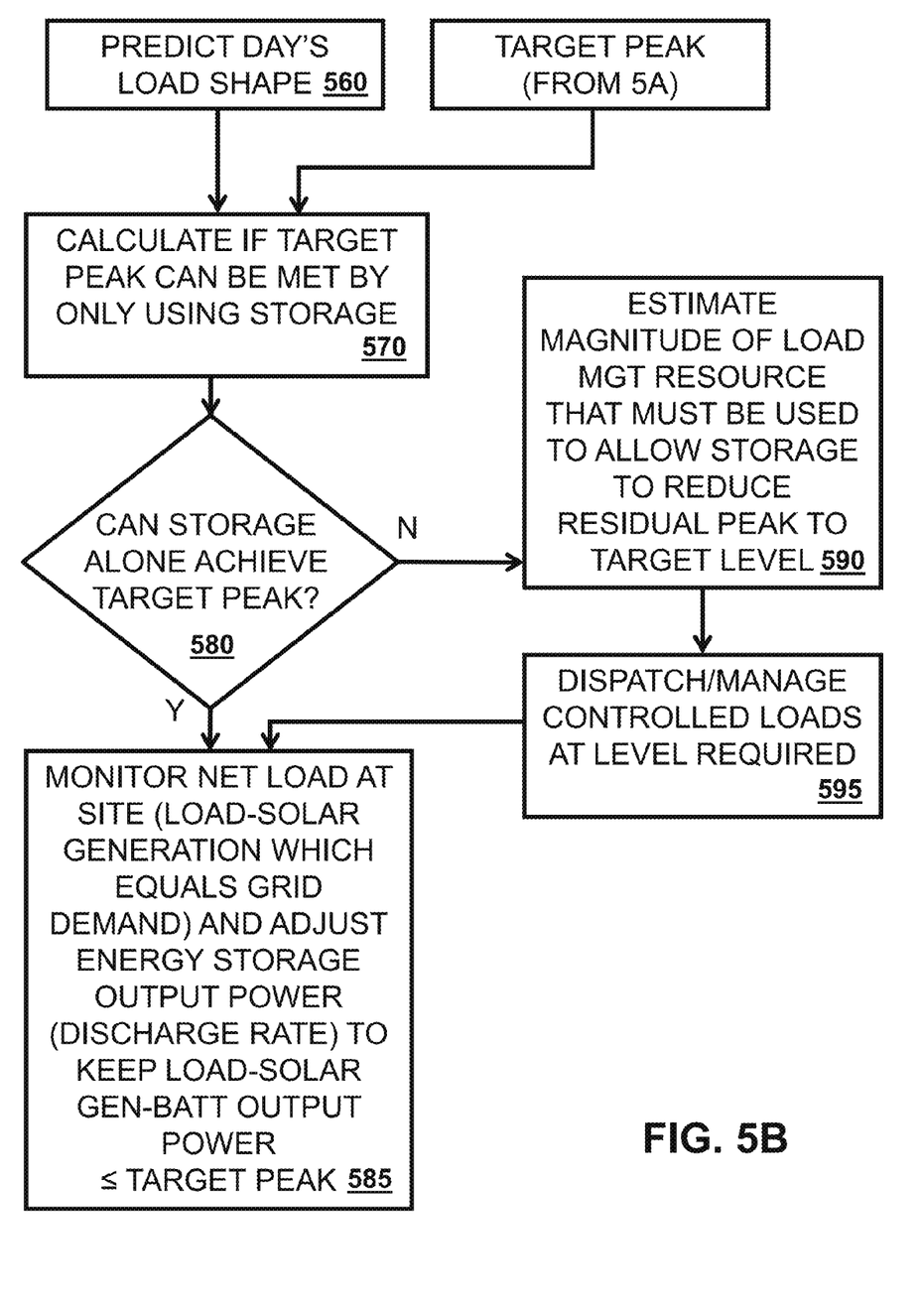

FIG. 5B depicts the controller in operation where it may predict the day's load shape (step 560) and using the target peak calculated in step 550 of FIG. 5A, calculated in the previous step, calculate if the target peak may be met by only using the storage device (step 570). The system controller may test (test 580) whether the storage device alone can achieve the target peak. If so, then the system controller may continuously monitor the net load at the site, for example, a load minus solar generation which equals the grid demand, and adjust the energy storage output power, i.e., discharge rate, to keep load-solar generator battery output power at a level equal or less than the target peak (step 585). If the storage device alone may not achieve the target peak, the system controller may estimate (step 590) the magnitude of load management resource that must be used to allow the storage device to reduce the residual peak after dispatch of managed loads to the target peak load level. Accordingly, the system controller may then dispatch and invoke the managed controller loads at the required levels (step 595), that will then allow the system controller to continue to monitor the net load at the site and adjust the energy storage output power and load management level to keep the load output power equal or less than the target peak load. In some embodiments, the system may also need to monitor for under-prediction of the day's peak load and if it seems this has occurred, dispatch additional load management resources, if available.

Figure 6A:
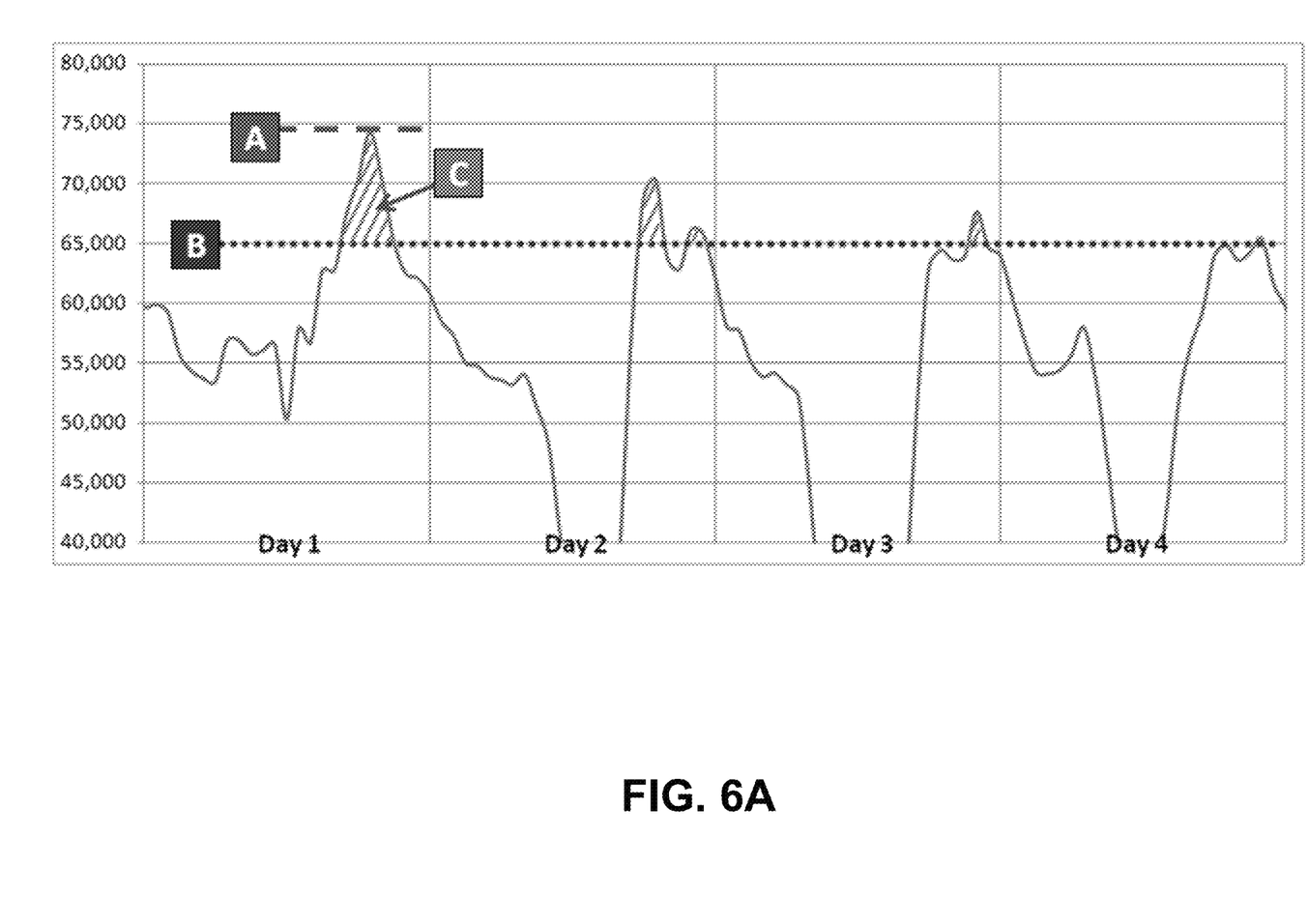
FIG. 6A is an exemplary graphical depiction of an energy management system without load management.
Figure 6B:
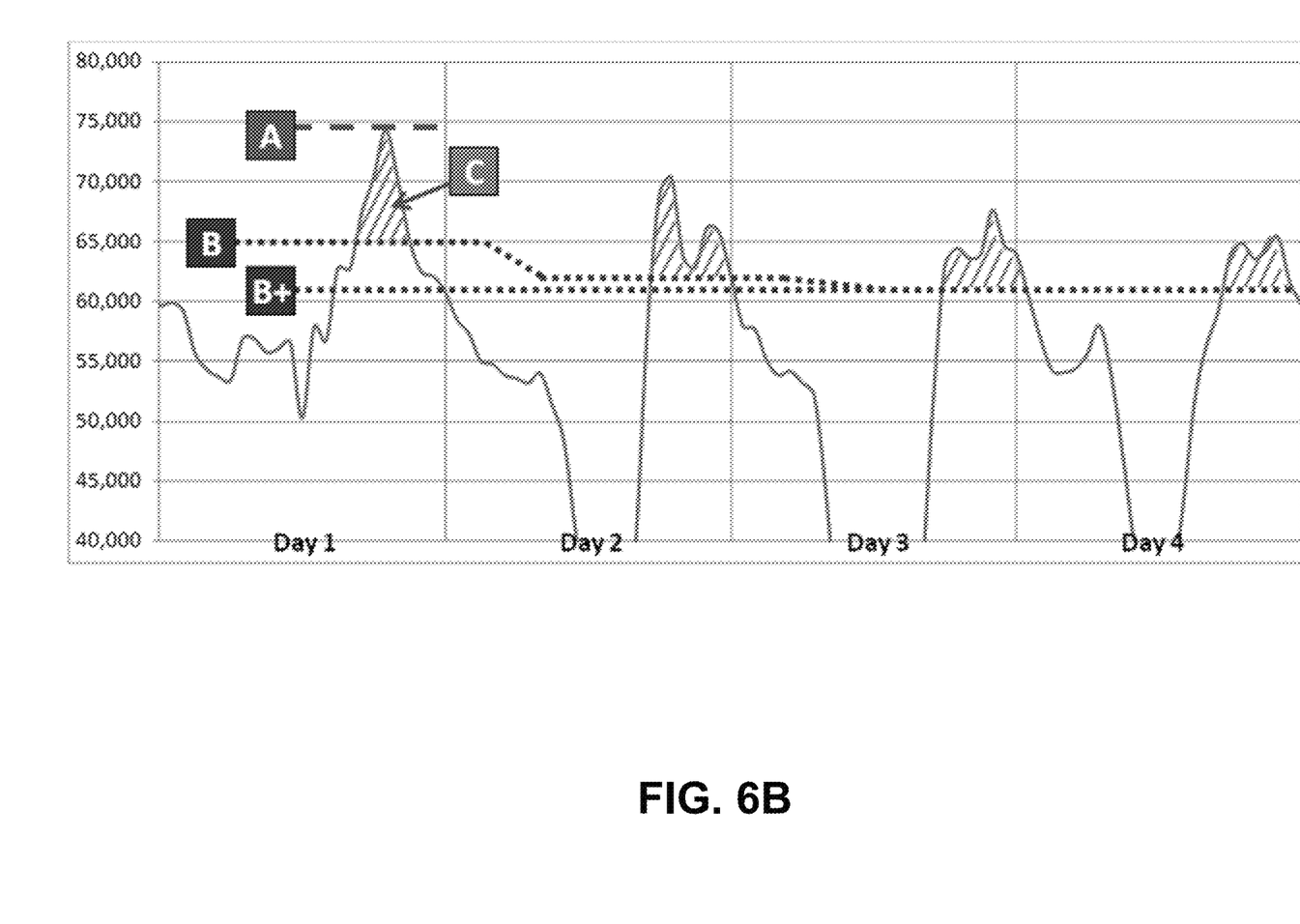
FIG. 6B is an exemplary graphical depiction of an embodiment of the energy management system with load management.

FIGS. 6A and 6B depict an exemplary trace of an effective load for a property over a four day period. In some exemplary embodiments, the exemplary graph is for a property with electrical systems contributing approximately 70 kW of peak load, where a solar PV system with approximately 60 kW capacity may also have been deployed; hence the large drop in load in the middle of the day, when solar output may be high. FIGS. 6A and 6B further illustrate a line labeled "A" that may show the peak demand at the site for the four day period, which is approximately 75 kW and occurs on day 1. As such only load "A" may contribute the demand charge for the site from among these four days, in the example where the utility billing period for demand charges is a four day period aligned with the data of FIGS. 6A and 6B. Additionally, while FIGS. 6A and 6B illustrate the operations of an energy management system over a four day period, other exemplary systems may operate over a number of days equivalent to the utility billing period over which peak demand may be assessed to determine the demand charge billed to the customer for that particular billing period. The time period may, for example, be a one month period, where the one month period may not be aligned directly to a calendar month. In one example, the entire calendar year may be used as a billing period. Optionally, any billing period size may be applicable.

FIG. 6A depicts an exemplary graphical representation of an energy management system without the load management embodiments of the present application, for a property over a four day time period. In FIG. 6A, if the battery system is deployed at the site, the system may be able to reduce the peak load for this four day sample by discharging stored energy during the times of maximum demand. The discharging of the stored energy may thereby reduce the peak on the worst day, e.g., day 1; the size of that peak may be the limiting factor on the achievable energy load and consumption reduction. The resulting reduced peak-load that may be achieved while solely using a battery system during this sample period is labeled "B." The magnitude of "B" may depend on the size of the storage system and area of the load curve to point "B," shown as the shaded area labeled "C." In this example, "B" may be approximately 65 kW and the shaded area, which represents effective battery capacity in kWh, may be approximately 30 kWh. In a system only comprising a battery storage device, the load "B" may become the target peak load for the four day sample period, where in practice, a sample period may be expected to be one month or a longer period. As depicted by the shaded areas in FIG. 6A, although unnecessary cycling of the battery may be avoided on days 2-4, battery utilization may be low and the battery may not be used on day 4 as the peak load on day 4 does not exceed the target peak load of 65 kW that was set based on the size of the day 1 peak.

Accordingly, in the exemplary system as depicted in the graph of FIG. 6A, battery storage capacity, C, may allow peak on worst day to be reduced to 65 kW. Hence, B may become the target peak load for this exemplary four day period. On alternate days, battery is only used to bring peak down to the level of B, i.e., 65 kW in the exemplary graph. In this embodiment, during days 2 and 3 very little battery capacity may be used to achieve peak load target B. As described, the system on day 4 does not use the battery. In this exemplary scenario without the load management embodiment, the battery utilization may be relatively low. FIG. 6B depicts the original load as the same as in FIG. 6A illustrating the energy management system as described in the embodiments of the present application for a property over a four day time period comprising manageable load assets that may be engaged to reduce the load on worst case day, day 1, to a new low target load. In FIG. 6B the new low target peak load is labeled as "B+" and "B+" may then become the new target peak load for this four day sample. In the exemplary graph of FIG. 6B, 4 kW of additional load control may be available, allowing 4 kW to be shed, resulting in an improved target peak load reduction of 61 kW ("B+"). In the subsequent days, storage and load management assets may be managed to reduce the load to this new "B+" target. Initially, the storage asset may be used to full capacity in an attempt to realize the "B+" target. The use of this battery capacity may again be illustrated by the shaded area above line "B." If the battery alone reduces the peak on days 2-4 to "B+," then no load shed of managed loads may be initiated.

In the exemplary embodiment, depicted in FIG. 6B, the level of peak load that may be achieved by the battery alone on days 1-4 is labeled as "B". As can be seen in FIG. 6B, the "B+" target may not be reached after exhausting the full capacity of the storage battery, and load shedding of managed load assets may also be initiated, although usually at a lower level than on the worst case day, in this example, day 1. In FIG. 6B, day 2 is illustrated where the battery may reduce the load only to 62 kW before the capacity may be exhausted. Accordingly, 1 kW additional load reduction may be required and management of the available managed loads may be used to achieve the additional load reduction. In some embodiments, for example, only 25% of the load shedding capacity may be utilized, and accordingly the impact on the operation and comfort at the property may be significantly less than if full load management capacity were used. In one embodiment, during day 3 and 4, the battery may be able to reduce the load to the target "B+" without the need for operating load management at the site. Additionally, less battery capacity may be used on day 4 versus day 3, as the area between target "B+" and the peak on day 4 is lower for day 3. In an exemplary system embodiment, unnecessarily cycling of the battery may be avoided. Comparing the shaded areas, labeled "C", of the FIG. 6B to that of FIG. 6A, which corresponds to usage of the battery storage capacity, it is evident that the battery system may be more effectively utilized in the case of FIG. 6B, when load management is integrated with the system.

Figure 7:
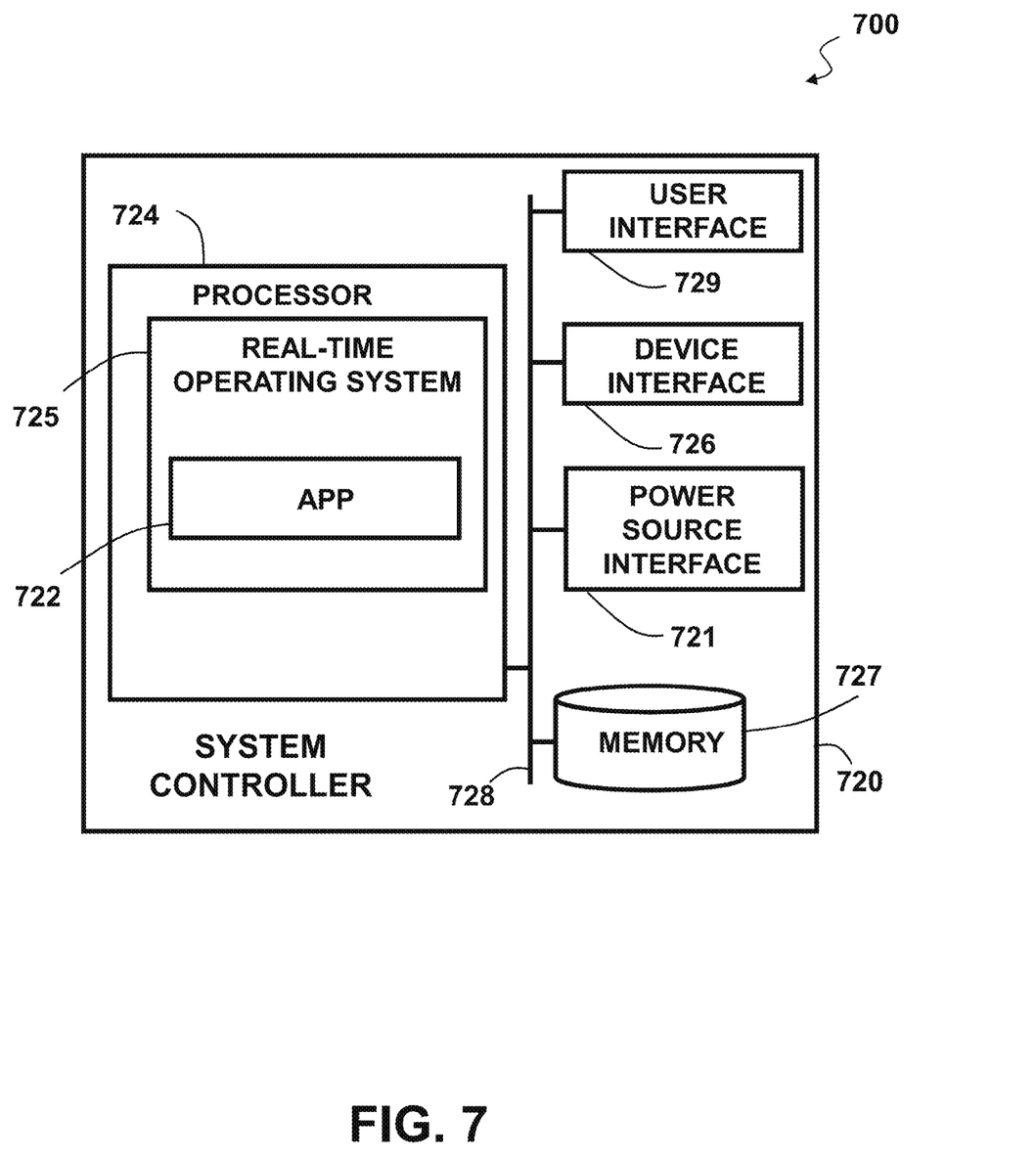
FIG. 7 is a functional block diagram of an exemplary system controller processor.

FIG. 7 is a functional block diagram 700 of an exemplary system controller 720 having a processor 724 and memory 727 addressable via a data bus 728. The system controller 720 may also include a user interface 729, a power source interface 721, and an interface 726 by which one or more local devices may communicate with the processor 724 via the data bus 728. In one exemplary embodiment, the processor 724 may be configured to execute programmed steps via a real-time operating system 725 where the steps that comprise the application 722 may include energy consumption and/or energy production inputs that are taken or estimated, comparisons are made with load capabilities and priorities of engaging or disengaging load elements, and commands and/or values are sent to local devices for energy management.

Figure 8:
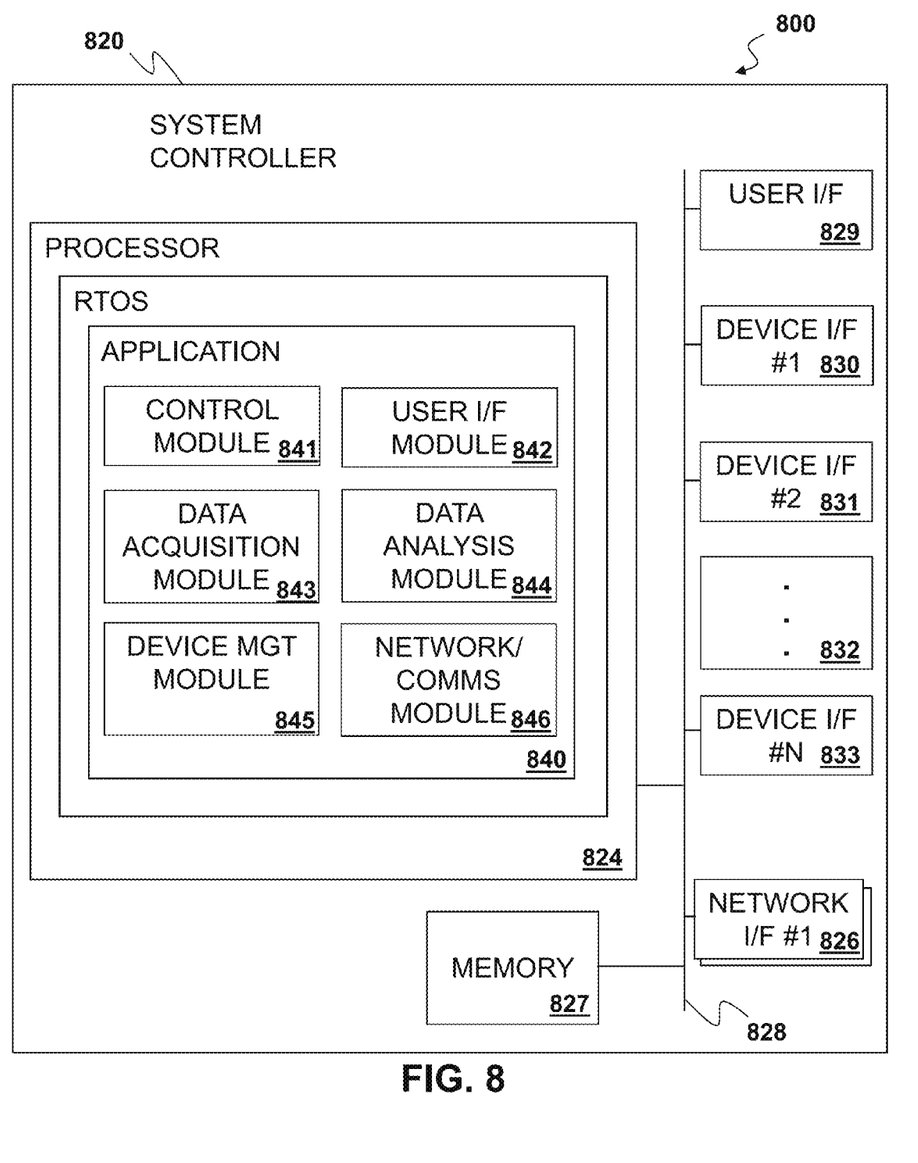
FIG. 8 is a functional block diagram of an exemplary system controller.

FIG. 8 is a functional block diagram 800 of a more detailed exemplary system controller having a processor 824 and memory 827 addressable via a data bus 828. The system controller 820 may also include a series of user interfaces 829-833, and an interface 826, i.e., network interface, by which one or more local devices may communicate. In one exemplary embodiment, the processor 824 may be a real-time operating system (RTOS) where it may serve real-time application requests where the level of consistency concerning the amount of time it takes to accept and complete an application's task is of importance. The processor may be configured to execute applications 840 where it may include the following: control module 841, user interface module 842, data acquisition module 843, data analysis module 844, device management module 845, and network communications modules 846. The controller may be placed on-site, e.g., taking place or provided at the location, or may be placed in a remote location and thereby communicating with the energy storage controller and load management controller remotely, via a network link.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A peak load management system at a local site, comprising:
   a battery system configured to store energy and discharge the stored energy when actual load exceeds a target peak load;
   one or more managed loads operatively coupled to a controller configured to reduce energy consumption when needed to meet the target peak load; and a peak load management processor operatively coupled with the battery system and the one or more managed loads, wherein the processor is configured to:
  determine a predicted peak load based on previously collected historical load data of the local site, wherein the predicted peak load is associated with a worst case day having highest energy consumption at the local site and wherein the worst case day is a day in a previous billing period where all available managed loads were shed;
  determine the target peak load for the billing period based on: the reduced energy consumption on the worst case day of previous billing periods and available battery system capacity and power rating;
  measure, on a continual basis, actual load data, wherein the actual load data comprises: energy consumption information by a set of one or more energy consuming devices and on-site renewable energy generation devices;
  predict if operation of the battery system achieves the target peak load based on a reduction of the predicted peak load to the target peak load by discharging the battery system;
  reduce the energy consumption of the one or more managed loads to achieve the target peak load based on the predicted operation of the battery system, wherein the energy consumption of the one or more managed loads is reduced by the controller in conjunction with discharge of energy from the battery system by an energy storage controller to maintain the target peak load; and
  monitor the predicted peak load for under-prediction and if the system determines that an under-prediction was made, then dispatch additional load management resources to shed one or more managed loads.

2. The system of claim 1 wherein the peak load management processor is further configured to:
  calculate a target peak load based at least in part on:
    past actual load;
    energy storage and power capability of battery system; and
    estimated reduced energy consumption achievable by shedding
    managed loads.

3. The system of claim 1 wherein reduction of the energy consumption of the one or more managed loads is invoked if energy supply level of the battery system is predicted to reach zero while attempting to meet the target peak load.

4. The system of claim 3 wherein the degree of energy consumption reduction invoked is determined from a predicted peak load, based at least in part on past actual load.

5. The system of claim 3 wherein the energy consumption is reduced if the actual load is greater than the target peak load.

6. The system of claim 1 wherein the system is configured to periodically predict if the battery system can achieve target peak load at currently dispatched levels of load management, and additional load management resources are dispatched as needed based on this prediction.

7. The system of claim 1 wherein the target peak load is further based on a peak demand energy usage of a real property.

8. The system of claim 1 wherein the peak load management is further configured to:
  shed the energy consumption of the one or more managed loads via partial
  control of the one or more managed loads.

9. The system of claim 1 wherein the peak load management processor is further configured to predict the worst case day in real-time so as to collect data and send control signals to the battery system and the one or more managed loads, in order to achieve the target peak load on each day of the billing period.

10. The system of claim 1 wherein the worst case day is a day in a previous billing period where all available managed loads were shed to reduce energy consumption so that the target peak load was not exceeded.

11. The system of claim 1 wherein the processor is further configured to monitor the predicted peak load for under-prediction based on a comparison of the actual load to the target peak load and if the system determines that an under-estimation was made, then dispatch additional load management resources to shed one or more managed loads.

12. The system of claim 11 wherein the processor is further configured to monitor the predicted peak load for under-prediction based on a comparison of the actual load to the target peak load, and if the system determines that an under-prediction was made, then reexecute: the determine predicted peak load, the determine target peak load, the measure actual load data, and the reduce energy consumption, and thereby dispatch additional load management resources to shed one or more managed loads.

13. A method comprising:
  predicting, by a peak load management processor operatively coupled with a battery system and one or more managed loads, if operation of the battery system achieves a target peak load based on a reduction of a predicted peak load to the target peak load by discharging the battery system;
  determining, by a peak load management processor, a predicted peak load based on previously collected historical load data of a local site, wherein the predicted peak load is associated with a worst case day having highest energy consumption and wherein the worst case day is a day in a previous billing period where all available managed loads were shed;
  determining the target peak load for the billing period based on: the reduced energy consumption on the worst case day of previous billing periods and available battery system capacity and power rating;
  measuring, on a continual basis, actual load data, wherein the actual load data comprises: energy consumption information by a set of one or more energy consuming devices and on-site renewable energy generation devices;
  predicting if operation of the battery system achieves the target peak load based on a reduction of the predicted peak load to the target peak load by discharging the battery system;
  reducing the energy consumption of the one or more managed loads to achieve the target peak load, wherein the energy consumption of the one or more managed loads is reduced by an energy storage controller in conjunction with discharging energy from the battery system to maintain the target peak load; and wherein the battery system is configured to store energy and discharge stored energy when actual load exceeds the target peak load; and
  monitoring the predicted peak load for under-prediction and if the system determines that an under-prediction was made, then dispatching additional load management resources to shed one or more managed loads.

14. The method of claim 13 wherein reducing energy consumption of the one or more managed loads is invoked if energy supply level of the battery system is predicted to reach zero while attempting to meet target peak load.

15. The method of claim 14 wherein the degree of energy consumption reduction invoked is determined from a predicted peak load, based at least in part on past actual load.

16. The method of claim 13 wherein the load reduction is invoked if energy consumption of the one or more managed loads is greater than the target peak load.

17. The method of claim 13 wherein the peak load management processor periodically predicts if the battery system can achieve target peak load at currently dispatched levels of load management, and additional load management resources are dispatched as needed based on this prediction.

18. The method of claim 13 wherein the target peak load is further based on a peak demand energy usage of a real property.

19. The method of claim 13 further comprising:
calculating a target peak load based at least in part on:
past actual load;
energy storage and power capability of the battery system; and
estimated reduced energy consumption achievable by shedding
managed loads.

20. The method of claim 13 wherein the worst case day is a day in a previous billing period where all available managed loads were shed to reduce energy consumption to maintain the target peak load.

* * * * *